Aug. 15, 1967  E. LEATHAM ETAL  3,336,108
MULLITE PRODUCTION
Filed Aug. 7, 1964

270X
(MAGNIFICATION)

270X
(MAGNIFICATION)

270X
(MAGNIFICATION)

INVENTORS.
EDWARD EINSTEIN,
EARL LEATHAM,
ELDON D. MILLER, JR.,
ALBERT H. PACK &
WILLIAM W. CAMPBELL

William C. Nealon
ATTORNEY 3,336,108
MULLITE PRODUCTION
Earl Leatham, Wexford, Pa., Albert H. Pack and William W. Campbell, Ludington, Mich., Edward Einstein, Homestead, and Eldon D. Miller, Jr., Bridgeville, Pa., assignors to Harbison-Walker Refractories Company, Pittsburgh, Pa., a corporation of Pennsylvania
Filed Aug. 7, 1964, Ser. No. 388,255
6 Claims. (Cl. 23—110)

The present invention relates to a process for producing mullite grains of high purity and density and stability using crude bauxite as the source material.

Heretofore, many difficulties have been encountered in the production of mullite from various alumina silica ores. In particular, mullite production from crude bauxite has posed serious problems in that the impurity level, especially iron impurities (about 2 or 3%, by weight), is relatively high; and known methods for removal thereof are uneconomical or complex. For instance, bauxitic ores have been subjected to various grinding operations in the dry state to mix and blend the materials, followed by flotation or other expensive chemical methods for removal of impurities.

Another problem is that it has been found difficult to produce mullite grains having maximum crystal growth. Subsequently, when refractory brick are produced from the mullite grains having less than maximum crystal growth, they tend to fracture upon use in metallurgical furnaces when operated at elevated temperatures (i.e. 3000° F.). This occurs since the crystals grow at temperatures up to about 3360° F., which growth causes expansion in various directions in the refractory shape.

Therefore, an object of the present invention is to provide a process for producing substantially iron-free mullite from crude bauxite.

Another object of the invention is to provide a process for producing relatively stable mullite grains having maximum crystal size from crude bauxite.

Still another object of the invention is to provide a process for economically producing mullite from crude bauxite.

Other objects of the invention will become apparent hereinafter.

In order to more fully understand the nature and scope of the invention, reference should be had to the following detailed description and drawings of which:

Briefly, according to one aspect of the invention, there is provided a novel process for producing a stable mullite aggregate from crude bauxitic ore. The method includes agitating and dispersing the bauxite ore to obtain aqueous suspension, in which bauxitic material is physically disassociated from nonbauxitic impurities which may then be easily removed. The resulting mixture is screened through a sieve of suitable size, for instance, a 10 to 48 mesh (Tyler) sieve to remove the coarse impurities. If desired, the slurry may be treated by passing it through a filter to concentrate solids to as high as about 70 to 75%, by weight, on the wet basis. The resulting slurry, containing the fines, is fed to a roasting or calcining furnace to remove all of the free and all, or substantially all, of the chemically combined water. The temperature of the furnace is maintained between on the order of 1500 to 2000° F. The resulting calcine is then compressed to form briquettes at a pressure of about 10,000 lbs. per linear inch. The briquettes are fed to a vertical kiln. There is a residence time of at least about 1 hour. The temperature of the hot zone of the kiln is maintained between about 2900° F. and a temperature just below the incipient fusion point of the bauxitic material, to form relatively large, well-developed, and closely-packed crystals of mullite thereby providing stable grains.

Figure 1:
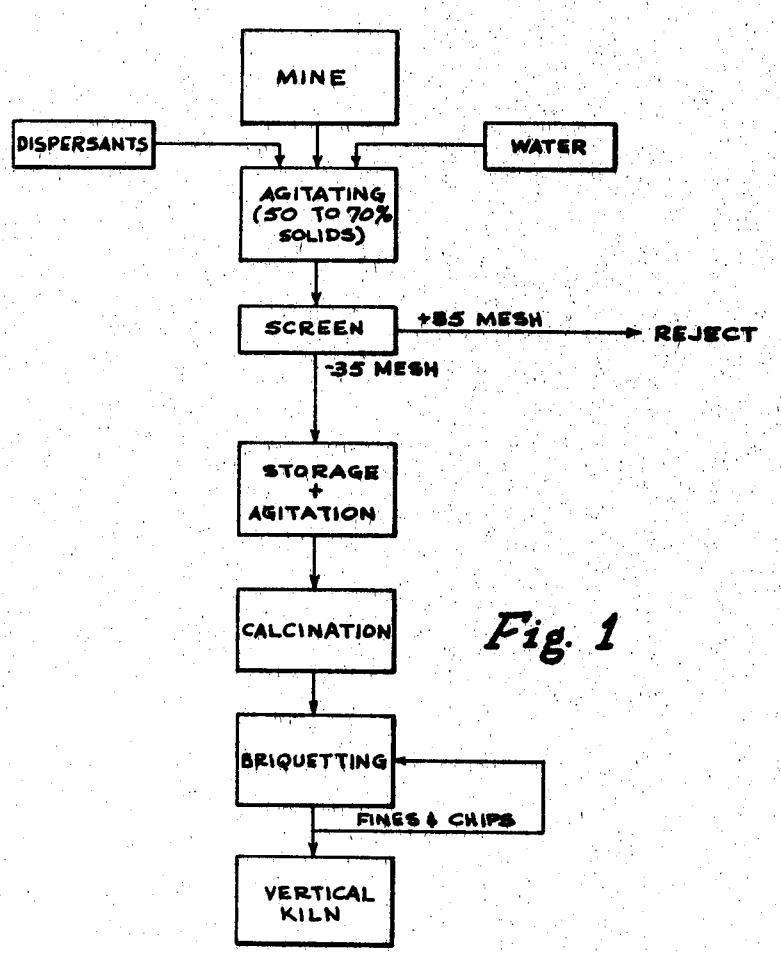
FIG. 1 is a schematic representation of a flow sheet of the process.

More particularly and with reference to the flow diagram of FIG. 1, the bauxitic ore processed in accordance with this invention contains, by weight on an oxide ignition free basis, at least about 70 to 80%, and preferably 72 to 75% $Al_2O_3$. The crude ore is placed in a dispersing tank having agitating means such as a group of Lightnin' mixers. The agitating means may be of any conventional type though, such as, mechanical stirrers, beaters, pumps, and the like. It should be appreciated that, where the run of the mine ore contains large pieces (plus 2″) and a dispersing tank is relatively small, it will be desirable to fracture the large pieces; however, this is not always a necessary step in the process. Water and a dispersing agent are added to the dispersing tank, and the mixture is agitated at about 400 to 500 r.p.m. in a preferred embodiment. The agitation is carried out to yield a uniform or homogenous, almost colloidal, suspension of bauxitic material containing from 40 to 70%, by weight of solids, consisting primarily of silica and alumina with a small amount of fine trace impurities. Substantially all the impurities, predominantly insoluble iron salts, will be released from the particles of the bauxitic material in the dispersing tank. It is believed that in order for the bauxitic material to remain in suspension, the agitation should be carried out until practically all the material has a particle size having an upper limit of 10 microns.

Many dispersing agents have been tested to provide the required colloidal suspension. For example, sodium silicate, sodium carbonate, sodium citrate, ammonium hydroxide, ortho and polyphosphates of alkaline metal, water soluble phosphate glasses, and proprietary organic poly electrolytes have been successful dispersants. The dispersing agent may be added in amounts from about 0.1 to 2%, by weight, based on the total weight of the dry solids in the dispersing tank. The actual amount of dispersant added is governed by the particular agent used, economy, and consideration of the tendency to introduce impurities to the mixture. A particularly good and preferred dispersing agent, for the purposes of this invention, is a mixture which consists of a 1 to 2 to 1 to 5 (by weight) mixture of sodium phosphate (containing approximately 67% $P_2O_5$) and ammonia in the form of ammonium hydroxide. The above dispersant works particularly well in amounts of from 0.1 to 1% per unit of dry solid with 0.5% being optimum. Further, it is preferred that the solid concentration in the colloidal suspension be maintained at about 50% or more since a lesser amount increases the fuel required in the burning operation.

The suspension, still in its substantially uniform state of dispersion, is classified to remove the coarse nonbauxitic impurities. It has been found that a 35 mesh screen or sieve (Tyler) is quite satisfactory to remove substantially all of the impurities viz $Fe_2O_3$ and quartz. However, it should be understood that other screens or water classifiers may be employed for impurity removal, depending on the particular ore deposit employed in the particle size of naturally contained impurities.

In some instances, there remains with the +35 fraction of non-bauxitic impurities, a small number of alumina nodules. These nodules may be subjected to a light crushing or more aptly "fracturing" operation and then recirculated through the dispersing tank. The terms "fracture" and "fracturing" are meant to describe exertion, of only sufficient force to break up alumina nodules and lumps of bauxite, but not sufficient to break up the much harder nodules of iron salts, such as, pyrite, etc. Alternatively, the alumina nodules may be broken up and uniformly suspended by increasing the agitating action in the dispersing tank up to, for example, 800 r.p.m.

The agitation and dispersion of the bauxitic material is so complete that from 90 to 95% of the −35 mesh material has an average particle diameter of from 2 to 5 microns, and this is considered indicative of the uniformity obtainable.

The screened suspension is fed to a storage tank, if necessary, and suitably agiated to maintain the uniform quality of the suspension. Owing to the fine particle size of the bauxitic material, the agitation need not be too rigorous as the small particles tend to remain in suspension. A stirring action of about 20 r.p.m. is satisfactory when the material must remain in suspension for any extended period of time. It should be noted that any fine impurities remaining in the mixture will be uniformly suspended throughout with the alumina and silica, so that, not to be deleterious to brick made subsequently from the resulting mullite grain of this invention.

The suspended bauxitic material is easily pumped from the storage tank to a calcination furnace for water removal and partial densification. This burn is performed for such time and at such temperatures as will remove all of the free and chemically combined water, but short of a temperature that will produce mullite grains.

The furnaces employed in calcination are of the multiple heat type, e.g. Herreshoff furnaces. These multiple hearth calciners receive a charge on the top shelf and, by rabble arms and gravity, move it successfully downward from one hearth to the last one from which it is discharged. It is normal to operate multiple hearth furnaces with a firing zone limited to the central or intermediate shelves, with the charge being preheated on the higher shelves and being cooled by incoming air on the lower shelves. Maximum efficiency of fuel utilization dictates that a fairly cool product shell be discharged. This also gives a product which can readily be handled. Contrawise, a feature of the present invention results from avoidance of this usually cooling zone, and using essentially all of the roaster areas for calcining. Thus, burners are provided on one or both of the lower shelves so that the calcined bauxite is hot when discharged.

In the multiple hearth calciners with which this burn is accomplished, the load temperature reaches 1500 to 2000° F., suitably 1800° F., and can be controlled closely at any chosen temperature within this range. The calcined bauxitic material is discharged from the roaster at a high temperature above 600 to 800° F. and, preferably, higher, even as high as 2000° F.

Having to a large extent densified the bauxitic material by calcining it, the hot bauxite is moved from the calciner to the pressing or briquetting apparatus. Here, the calcined materials are dry pressed or compacted into shapes by briquetting rolls under extremely high pressure, for example, to yield almond shaped briquettes about 1.5″ long, ¾″ wide, and ⅝″ thick. No water, temporary, or chemical bond is used for these briquettes. Pressures of at least 10,000 lbs. per linear inch and preferably higher are necessary in order to insure high density grain of the final product. Further densification may be achieved by subjecting the compressed bodies to at least one further pressing operation under similar pressure. However, a single pass through the briquetting rolls has been found to provide a body, having a density of about 2 grams per cc. and of such strength that few broken chips result. These chips are normally screened off and recycled along with the fines to the feed to the briquetting rolls in the interest of economy. This briquetting is normally carried out at room temperature although pressing at elevated temperatures, such as, up to 2000° F. and higher, has proved satisfactory. The pressing at elevated temperatures is thought to remove any water mechanically retained by the material, thus, giving a somewhat denser briquette.

The briquettes are then fed to, preferably, a vertical kiln and are moved therethrough at such a rate that the bauxitic material has a kiln residence time of about from 2½ to 5 hours. It is desirable that the material be in the burning zone of the kiln for a period of about from 45 min. to 2 hours for the best results. The burning zone of the kiln is maintained between about 2900° F. to just below the incipient fusion temperature of the bauxtic material, which latter temperature is of the order of about 3360° F. Accordingly, a particularly useful range of temperatures according to the invention is from about 2900° F. to about 3300° F.

It has been discovered that mullite crystals effectively double in size for each 200° rise in temperature at a burn between 2900° F. and 3300° F. Large crystal sizes are desirable in a stabilized mullite grain aggregate, because the reduced voids increase the refractoriness and resistance to subsidence at elevated temperatures in subsequently formed mullite brick. Bauxitic material, when burned at temperatures below 2900° F., were found to have distressingly small crystal size, many voids, and a ground mass of unconverted alumina and silica. Uncoverted silica is particularly undesirable because of the crystal phase changes silica undergoes during heating and cooling. These crystal phase changes (reversible formation of cristobalite, tridymite, etc.) can lead to brick failure.

Figure 2:
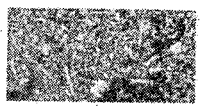
FIGS. 2 and 3 are photomicrographs of random mullite crystal orientation having less than maximum crystal size.
Figure 3:

Referring to FIGS. 2 and 3, there is shown mullite crystals formed upon burning bauxitic material at 2900° F. and 3100° F. respectively for a period of five hours. Notably, the crystals have not attained complete crystal growth.

Figure 4:
FIG. 4 is a photomicrograph of the preferred, closely-packed random mullite crystal orientation in the product recovered from the process of the invention.

Therefore, it is particularly desirable that the burning zone temperature be maintained close to 3300° F. since, at about this temperature, the mullite crystals will attain maximum crystal growth assuming close, dense packing. FIG. 4 is illustrative of such packing.

Crystal size is important. If an optimum or maximum size is not reached during the operation of burning the briquettes, ultimate shapes formed from the briquettes, when subjected to the temperatures above the grain burning temperature, increase in size due to increase in mullite crystal size thus expanding and destroying the shape. It is not known, in precise numeral dimensions, what the optimum crystal size is. However, it is known that, by following the teachings of this invention, satisfactory size is obtained.

The following example is illustrative of the teachings of the invention.

*Example 1*

Crude Alabama bauxite having the following typical chemical analysis, by weight on an oxide ignition free basis, was placed in a 55 gal. dispersing tank:

|  | Percent |
|---|---|
| $SiO_2$ | 21.3 |
| $Al_2O_3$ | 75 |
| $TiO_2$ | 2.6 |
| $Fe_2O_3$ | 1.1 |
| CaO | 0.1 |
| MgO | Neg. |
| Alkalies | 0.1 |

A suitable amount of water was added to the crude ore in the tank along with a mixture of 0.15% of sodium phosphate (33% $Na_2O$ and 67% $P_2O_5$) and 0.4% $NH_4OH$, in order to provide a 50% solids concentration. The mixture was agitated with a mechanical stirrer at about 400 r.p.m. to disperse the bauxitic material and provide a uniform, almost colloidal, suspension. The slurry or suspension was passed through a 35 mesh screen, and the +35 mesh impurities were removed. The impurities were found to consist primarily of nodules of hydrated iron and iron compounds, such as, pyrite, the total amount of impurities being about 3.1%, by weight, of the feed material. The −35 mesh bauxitic material was analyzed on an oxide basis with the following results (weight percentages):

| | Percent |
|---|---|
| $SiO_2$ | 21.3 |
| $Al_2O_3$ | 75.7 |
| $TiO_2$ | 2.2 |
| $Fe_2O_3$ | 0.5 |
| $CaO$ | 0.08 |
| $MgO$ | Neg. |
| Alkalies | 0.1 |

The particles size (diameter) of 95% of the material was about 3 microns, and the small amount of $Fe_2O_3$ remaining was uniformly distributed with the $Al_2O_3$ and $SiO_2$. The −35 mesh material was then fed to a Herreshoff furnace for calcination. A temperature of 2000±100° F. was maintained on the lower hearths of the Herreshoff furnace, while the material was cycled through. The product exhibited about a 0.1% ignition loss. The material was discharged from the calciner at about 1800° F.

The calcium was then fed to the briquetting rolls, which were outfitted to produce almond shaped briquettes measuring about 1.5″ by ¾″ by ⅝″. The feed to the press showed a temperature of about 700° F. which proved ample. The compression rolls exerted a pressure of about 10,000 lbs. per linear inch to produce self-sustaining briquettes of good density.

These briquettes were conveyed to the top of a vertical shaft kiln. By screening the briquettes before their entrance to the kiln, it was found that breakage was less than 10%, by weight. Such breakage as existed was recirculated to the compression rolls. The briquettes were held at the kiln for about 4 hours, 1½ hours of which was residence time in the burning zone. The burning zone was maintained at about 3300° F. The briquettes discharged from the kiln were analyzed. The grain was found to contain mullite crystals, substantially larger than were formed when the same raw material was burned at temperatures less than 2900° F. The mullite appeared to have achieved well packed orientation and excellent crystal growth as is evident from FIG. 4.

The features and advantages of the present invention will be more readily appreciated by observation of the marked differences in grain size of FIGS. 2, 3, and 4. It is thus almost necessary that, in order to produce a superior mullite brick, the crude calcined bauxitic material be burned at a temperature of about 3300° F.

It should be understood that other bauxitic deposits may be processed in accordance with the invention with similarly good results.

Having thus described the invention in detail and with sufficient particularity as to enable those skilled in the art to practice it, what is desired to have protected by Letters Patent is set forth in the following claims.

We claim:

1. In the process for producing relatively volume stable mullite grains from crude bauxite, the bauxite containing at least of the order of 70 to 80% $Al_2O_3$, by weight on an oxide ignition free basis, the steps comprising forming the bauxite into an aqueous suspension by agitating and dispersing the bauxite to yield a uniform mixture consisting of bauxitic materials and nonbauxitic impurities, substantially all of said impurities having a particle size greater than the bauxite material, removing the nonbauxitic impurities from the mixture, calcining the resulting mixture, passing the calcine to means for forming small briquettes under a pressure of at least about 10,000 lbs. per linear inch and then burning the briquettes in a vertical kiln at a temperature of from 2900° F. to just below the incipient fusion point for a period of the order of at least 1 hour and recovering substantially iron-free mullite grain mineralogically characterized by relatively large and stable, well-packed crystals with few voids.

2. In the process for producing relatively volume stable mullite grains from crude bauxite, the bauxite containing at least of the order of 72 to 75% $Al_2O_3$, by weight on an oxide ignition free basis, the steps comprising forming the bauxite into an aqueous suspension by agitating and dispersing the bauxite until all of the bauxitic material has a particle size of less than 10 microns, screening the suspension to remove coarse impurities consisting predominantly of iron, calcining the bauxitic material in a furnace at a temperature of from 1500 to 2200° F., passing the calcine to means for forming small briquettes under a pressure of at least about 10,000 lbs. per linear inch, and then burning the calcined material in a vertical kiln at a temperature of from 2900° F. to just below the incipient fusion point and recovering substantially iron-free mullite grain mineralogically characterized by relatively large and stable, well-packed crystals with few voids.

3. In the process for producing relatively stable mullite grains from crude bauxite, the bauxite containing at least of the order of 70 to 80% $Al_2O_3$, by weight, on an oxide ignition free basis, the steps comprising mixing a quantity of the bauxite with about from 0.1 to 2%, by weight, of dispersing agents per unit of dry solids to yield a fine suspension containing at least 50%, by weight, of solids, substantially all of the solids having a particle size of less than 10 microns, removing any material having a particle size greater than 35 mesh, burning the solids at a temperature of between 1500 and 2200° F. for a time period sufficient to remove all free water and substantially all chemically combined water, passing the resulting bauxtic material without intervening hydration and at a temperature of about 700° F. to means for forming it into small compressed bodies under a pressure of at least 10,000 lbs. per linear inch and then passing the solids to a vertical kiln and burning them at a temperature of from 2900° F. to just below the incipient fusion point to a period of the order of at least 1 hour and recovering mullite grain mineralogically characterized by relatively large and stable, well-packed, crystals with few voids.

4. In a process of producing relatively stable, substantially iron-free mullite grains from crude bauxite, the bauxite containing at least of 70 to 80% $Al_2O_3$, by weight, on an oxide ignition free basis, the steps comprising mixing a quantity of the bauxite with about 0.1 to 1%, by weight, of a dispersing agent per unit of dry solids to yield a fine suspension containing from 50 to 70%, by weight, of solids substantially all of the solids being −35 mesh fines and having an average particle size of from about 2 to 5 microns, screening the material with a 35 mesh sieve, the +35 mesh material being primarily nonbauxitic impurities which are discarded, calcining the solids at a temperature of the order of 1800° F. for a brief period of time, passing the calcine to means for forming small briquettes under a pressure of at least 10,000 lbs. per linear inch, burning the briquettes in a vertical kiln at a temperature of from 2900 to 3300° F. for a period of at least 1 hour and recovering substantially iron-free mullite grain mineralogically by relatively large and stable, well-packed crystals with few voids.

5. The process of claim 4 in which the dispersing agent consists of a mixture of sodium phosphate glass, analyzing approximately 67% $P_2O_5$, and ammonia.

6. A relatively stable mullite grain characterized by large and stable, well-packed crystals with few voids, produced by forming crude bauxite into an aqueous suspension by agitating and dispersing the bauxite to yield a uniform mixture consisting of bauxitic material and non-bauxitic impurities, said impurities having a particle size substantially greater than the bauxitic material, removing the nonbauxitic impurities from the mixture, calcining the mixture, forming the calcine into relatively small, self-sustaining bodies at a pressure of at least 10,000 lbs. per linear inch, burning the bodies in a vertical kiln at a temperature of from 2900° F. to just below the incipient fusion point for a period of the order of at least 1 hour and recovering mullite.

References Cited

UNITED STATES PATENTS

| | | | |
|---|---|---|---|
| 2,524,816 | 10/1950 | Lyons | 23—110 |
| 3,132,955 | 5/1964 | Namishi | 106—67 |
| 3,261,699 | 7/1966 | Henry | 106—65 X |

OTHER REFERENCES

M. E. Tyrrell: Bur. of Mines Report No. 5957, pp. 1–7, 12 and 13 relied on.

OSCAR R. VERTIZ, *Primary Examiner.*

A. GREIF, *Assistant Examiner.*